United States Patent [19]
Naso et al.

[11] Patent Number: 5,012,765
[45] Date of Patent: May 7, 1991

[54] CAT LITTER SCREENING DEVICE

[75] Inventors: Joseph I. Naso, Lombard; Joseph L. Barbaro, Western Springs; John Howard, West Chicago, all of Ill.

[73] Assignee: Cielo Industries, Inc., Lombard, Ill.

[21] Appl. No.: 516,355

[22] Filed: Apr. 30, 1990

[51] Int. Cl.⁵ .................................. A01K 1/035
[52] U.S. Cl. ............................ 119/166; 209/251; 209/370
[58] Field of Search ............ 119/1; 209/251, 235, 209/370, 374, 373

[56] References Cited

U.S. PATENT DOCUMENTS

| | | | |
|---|---|---|---|
| 789,517 | 5/1905 | Williamson | 209/251 |
| 1,318,289 | 10/1919 | Kemmerer, Sr. et al. | 209/370 |
| 1,586,974 | 6/1926 | Devlin | 209/365.2 |
| 1,587,221 | 6/1926 | Eckstein et al. | 220/249 |
| 2,902,165 | 9/1959 | Imershein | 210/486 |
| 3,100,474 | 8/1963 | Schneider | 119/1 |
| 3,233,588 | 2/1966 | Thomas | 119/1 |
| 3,315,417 | 4/1967 | Roberts | 51/163.1 |
| 3,485,416 | 12/1969 | Fohrman | 222/142.1 |
| 4,096,827 | 6/1978 | Cotter | 119/1 |
| 4,325,822 | 4/1982 | Miller | 209/251 |
| 4,522,150 | 6/1985 | Gershman | 119/1 |
| 4,696,257 | 9/1987 | Neary et al. | 119/1 |

FOREIGN PATENT DOCUMENTS 71384 3/1916 Fed. Rep. of Germany .
2411772 12/1927 France .
190418 12/1922 United Kingdom .

Primary Examiner—Gene Mancene
Assistant Examiner—R. Thomas Price
Attorney, Agent, or Firm—Hill, Van Santen, Steadman & Simpson

[57] ABSTRACT

An improved animal waste collection and screening device having two litter pans in opposed orientation, an opened face of a first litter pan in facing arrangement with an open face of the second litter pan with a screen member in interposed relationship between the opposing litter pans. Tracks on the screen member guide and receive the first pan on a first face side of the screen member and guide and receive the second pan on a second face side of the screen member, holding the two pans securely together. The screen member provides on one longitudinal end a handle and two catches, one catch for engaging each said litter pan when each said litter pan is fully received by said tracks and properly oriented with respect to the screen member and the respective other litter pan. The catches are located approximate to the handle for convenient one hand engagement and disengagement, and are self engaging and manually disengaging devices. The screening device including the pans and the screen member, can be composed of a molded plastic. Once both pans are engaged to the screen member, the entire device can be transported by a person using the handle for convenience.

19 Claims, 2 Drawing Sheets

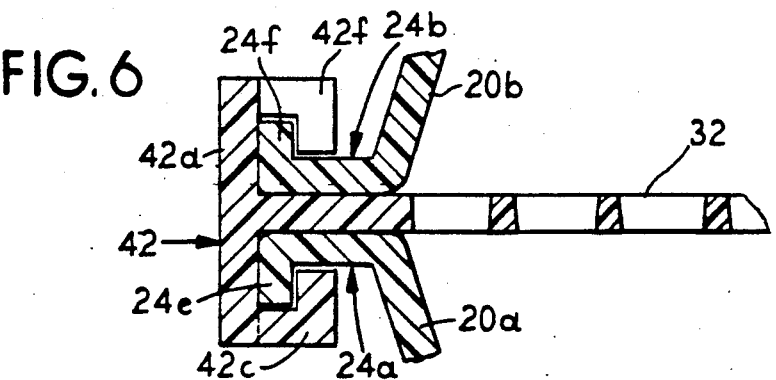
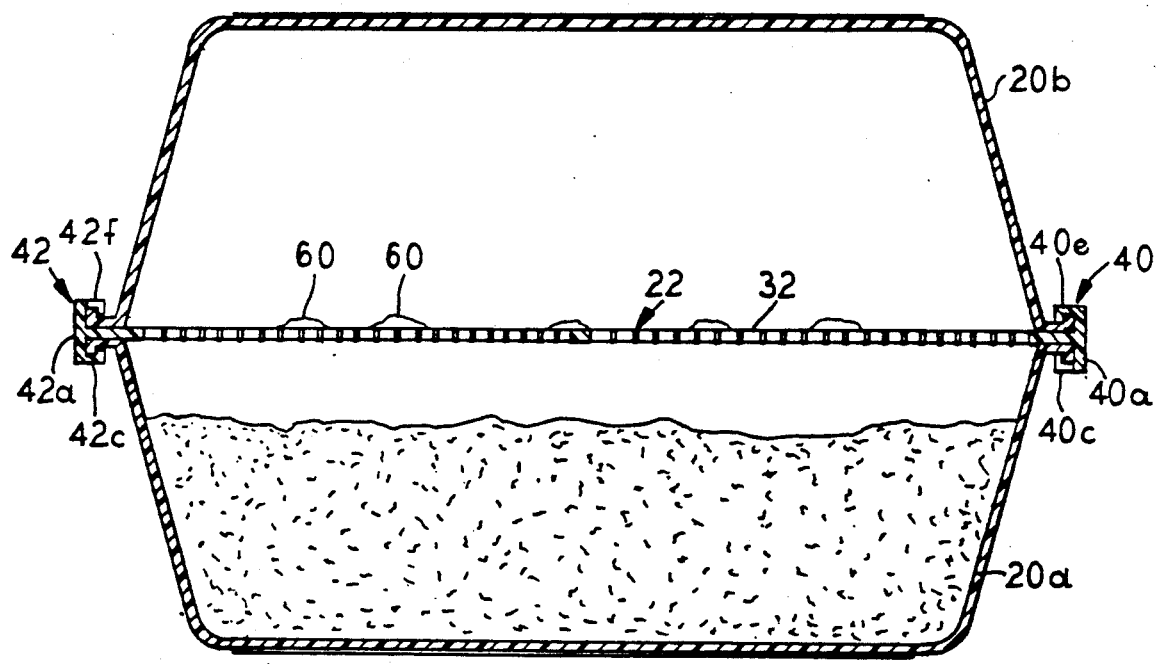
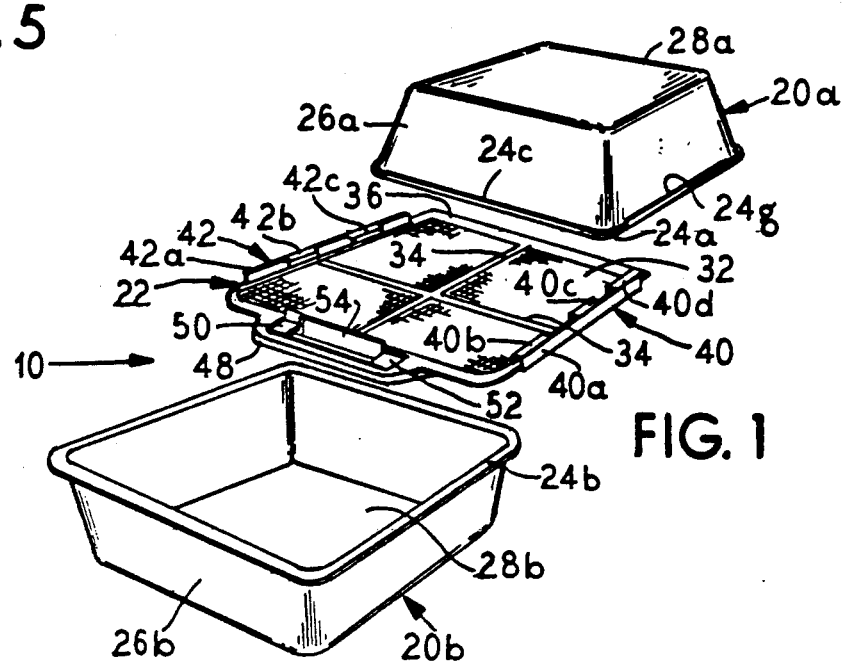

CAT LITTER SCREENING DEVICE

BACKGROUND OF THE INVENTION

The invention relates to an improved animal litter screening device, particularly a cat litter screening device comprising two cat litter pans removable positioned on opposite sides of a screen. By installing the screen and pans together and flipping the device upside down, used or soiled litter can be screened and recycled. The invention is an improvement over U.S. Pat. No. 4,325,822 to Miller, issued on Apr. 20, 1982.

In the Miller patent, two animal litter pans are removable connected with open portions of the pans in facing relationship to the respective other litter pan, the screen is positioned in interposed relationship between the opposed litter pans. Tracks on the screen member slidingly receive the litter pans to interlockingly and detachably engage the litter pans. Abutment members are mounted on opposite sides and opposite longitudinal ends of the litter screen, each abutment member preventing one of the litter pans from proceeding past the abutment member in sliding fashion along the longitudinal direction of the tracks. Therefore, because the abutment members are on opposite ends of the screen, each litter pan must be slidably removed in an opposite direction with respect to the screen, than the respective other litter pan.

Because of this abutment arrangement of the Miller patent, the operation of the pet litter separator of Miller can require more room to manipulate the device because the working area or staging area is effectively stretched out. This is demonstrated in FIG. 1 and FIG. 7 of the Miller patent. A person working close to the floor, in a crouched position, may have to rearrange his position several times to effectuate operation of the mechanism, to recycle the used litter. Of course, the various operations of the Miller patent could be performed without extending in length the working area by strategic rotation of the pans (about an axis normal to the floor) at a certain stage of the procedure. However, changing or recycling used animal litter is not a pleasant task to sight and smell, nor to the person's back as most animal litter receptacles are located on the floor, and a simple and quick operation is desireable. Requiring the person to simultaneously exercise coordination, dexterity and forethought to perform various positioning operations associated with such an unpleasant task is a drawback to the Miller patent. Simplifying the recycling steps is an advantage to the present invention.

Additionally, the Miller patent discloses a wire mesh screen. A wire mesh screen presents drawbacks in that it is more expensive to furnish for the screening assembly; once bent or damaged it can be difficult to engage to the pans; and once damaged can present cutting or pricking hazard to a person's hands.

The abutments of the Miller patent are strictly lateral stops. The abutments do not provide a looking means which can removably hold the animal litter pan assembly to the screen. The abutments of the Miller patent do not lockingly locate the two pans in proper position with respect to the screen and each other. Thus, when performing the various manipulations and flip overs required by the Miller patent it is conceivable that at least one of the animal litter pans and the screen could be misaligned or could become disengaged, spilling contents of the pans onto the floor. This is especially possible once the litter pan holding clumps and solid excrement is removed with the screen from the pan holding the recycled litter. Depending on the orientation of the abutment, if the person mistakenly pulls the top pan and screen from the recycled litter pan by applying removal force to the top pan rather than the screen handle, the top pan can quickly extend over the screen and possibly dump animal refuse onto the floor.

It is therefore new to the art to provide an improved animal litter screening apparatus which alleviates these drawbacks as well as other inventive advantages described hereinafter.

SUMMARY OF THE INVENTION

The present invention relates to an improved animal litter screening device, similar to the Miller patent but providing many advantages thereover. The device comprises three main components: two animal litter pans and a slidably removable screen member.

Objects of the present invention include:

providing an animal litter screening device which is used by the animal to deposit waste and quickly and easily used by a person to recycle soiled animal litter;

providing an animal litter screening device which is economical to manufacture;

providing an animal litter screening device which is durable and maintains useability for a long life;

providing an animal litter screening device which is self evident and foolproof in method of operation, requiring minimal patience, coordination, or dexterity to quickly use;

providing an animal litter screening device which requires a minimal staging area;

providing an animal litter screening device which provides a injury free construction for a long life of the device;

providing a screening device which can be conveniently stored;

providing an animal litter screening device which can be easily portable; and providing an animal litter screening device which resists accidental spillage of undesirable refuse or litter.

The objects of the invention are inventively achieved in that:

the device provides a litter pan for the animal to deposit waste and a cooperating screen and second pan for intermittent assembly to screen the used litter;

the device comprises a screen member which locates a screen member handle and a catch for each of two opposed litter pans on the same end of the device, thus both litter pans can be, in turn, slidably removed from the screen member in the same direction relative to the screen member;

the two litter pans and the screen member are all composed of a rugged plastic which is easily molded and inexpensively manufactured;

the device has no sharp corners or edges which could cause injury to an animal or a person;

the screen member does not use the wire mesh of the prior art therefore accidental cuts and pricks to the person's hands are eliminated;

the screen member utilizes a track means comprising a discontinuous channel, therefore reducing the effects of warping of the track as well as jamming of the corresponding litter pan engagement flanges inside the track means, the discontinuous channel configuration arranged to provide flexibility to install the pans;

the screen member comprises integrally formed plastic reinforcing ribs to insure integrity of the screen member for a long life;

the litter pans are slidably removable from the screen in a same direction making the device readily self evident, to minimize "figure it out" time for the inexperienced person o the infrequent person, who desires to minimize the time required to recycle the animal litter, the task being an unpleasant one;

the litter pans are removable from the screen member in a same direction minimizing the practical staging area for the recycle operation, because without any appreciable strategic planning the person can readily perform the recycle operation without extended reaching of the person's arms or changing the person's position on the floor with respect to the device;

the catches positively engage both litter pans to the screen member, instead of the abutments of the prior art, ensuring that the pans are properly positioned for the operation and that neither litter pan becomes disengaged from the screen member during the recycle operation, thus preventing accidental spillage of unwanted refuse or litter on the floor;

the catches, by positively locking the pans to the screen member, provide an arrangement where the screening device including one or two pans can be hung on a wall hook by the screen handle for storage;

the catches are located near to the screen member handle, a one hand operation being possible wherein the person can both pull the screen member with respect to either pan and simultaneously release either pan using the same hand; and the catches positively engage the two litter pans to the screen member, the animal litter screening device therefore becomes effectively a portable compartment, carryable by the screen member handle, such compartment can be used to temporarily carry animal supplies or other articles therein, this feature especially beneficial when taking the animal on family vacations or to pet shows.

BRIEF DESCRIPTION OF THE DRAWINGS

FIG. 1 is an exploded perspective view of components of the animal litter screening device;

FIG. 5 is a sectional view taken along line V—V of FIG. 3 showing the animal litter screening device assembled, and in a post screening stage of operation; and FIG. 6 is a partial enlarged view of a detail shown in FIG. 5.

DETAILED DESCRIPTION OF THE PREFERRED EMBODIMENTS

Figure 2:
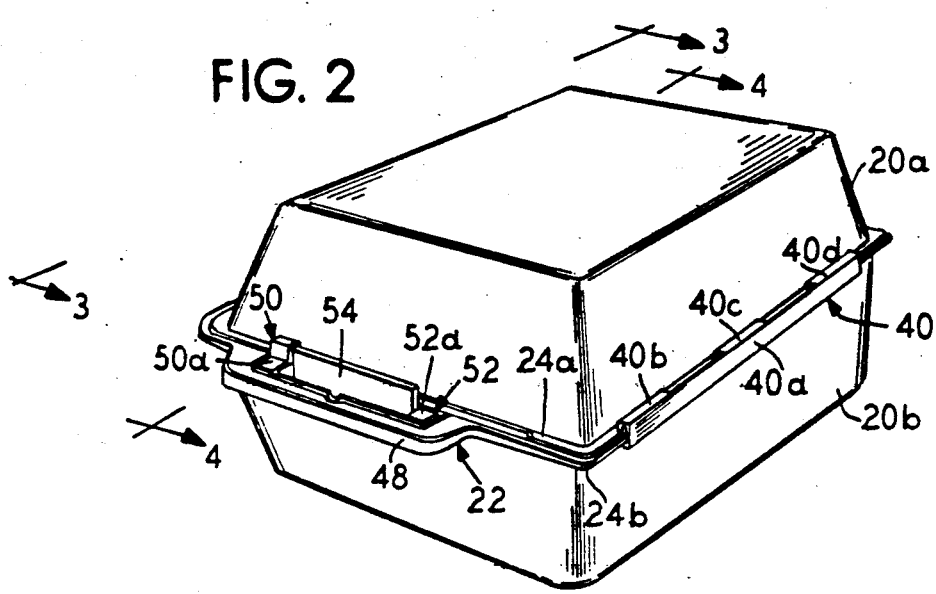
FIG. 2 is a perspective view showing the animal litter screening device assembled.

FIG. 1 shows the animal litter screening device generally at 10 comprising three major components:

A first litter pan 20a, a second litter pan 20b, and a screen member 22. The litter pans 20a, 20b have formed flanges 24a, 24b respectively which circumscribe open faces of the litter pans. The litter pans 20a, 20b are formed with perimeter sidewalls 26a, 26b respectively and bottoms 28a, 28b respectively which combine to give the litter pans 20a, 20b a generally rectangular open box shape. In the preferred embodiment the litter pans are of molded plastic construction.

The screen member 22 is a generally flat rectangular member having a screening plate 32 which can be a solid plane with a plurality of holes therethrough, or a grid arrangement. The screening plate 32 is reinforced by crossed ribs 34. The screening plate 32 is surrounded by a frame 36. Secured to the frame 36 are a first track 40 and a second track 42, the tracks arranged on opposite generally parallel or lateral sides of the screening member 22, and arranged longitudinally in a direction of removal of the litter pans from the screen member. Also attached to the frame 36 is a handle 48, a first catch 50, and a second catch 52.

FIG. 2 shows the animal litter screening device in an assembled stage of operation. The first litter pan 20a is empty and the second litter pan holds soiled litter ready to be recycled. The first litter pan 20a and the second litter pan 20b are arranged with opened ends in close proximity and in general congruence. The screen member 22 is disposed between the litter pans 20a, 20b by sliding engagement with the litter pans 20a, 20b at the first track 40 and the second track 42 (not shown in FIG. 2). An abuttment plate 54 is shown adjacent to the handle 48. This abuttment plate 54 aids the catches 50, 52 in preventing excessive longitudinal progression of the pans 20a, 20b onto the screen member 22 and also acts as a safety shield for the hand gripping the handle 48. The abuttment plate 54 can also be used as a hand bracing surface for hand pushing a pan slidingly onto the screen.

Returning back to FIG. 1, this figure shows that the first track 40 comprises a back wall portion 40a onto which is attached three L-shaped angle pieces 40b, 40c, 40d. The angle pieces are spaced apart along a length of the back wall portion 40a. The combination of the back wall portion 40a and the angle pieces form a discontinuous channel along the length of the first track 40. The second track 42 similarly comprises a second back wall portion 42a and two L-shaped angle portions 42b, 42c. The two angle portions 42b, 42c are spaced apart along a length of the second track 42, and attached to the second back wall portion 42a. Similar to the first track 40, the combination of the second back wall portion 42a and the angle portions 42b, 42c form a discontinuous channel along the length of the second track 42.

Below the screening plate 32, the second track 42 further comprises additional spaced apart, on an opposite face side, L-shaped angle portions 42e, 42f, 42g likewise connected to the second back wall portion 42a (shown in FIG. 3).

Figure 3:
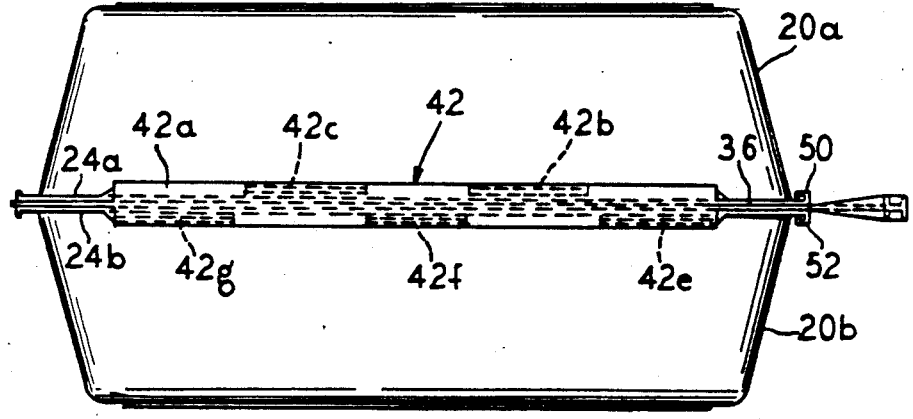
FIG. 3 is a side elevation view, viewed from line III—III of FIG. 2, of the animal litter screening device assembled.

As shown in FIG. 3 in dash lined fashion, the additional angle portions 42e, 42f, 42g in combination with the back wall portion 42a form a discontinuous channel, below the screening surface 32, along the length of the track 42. A similar arrangement is provided with first track 40 wherein two additional L-shaped angle pieces 40e and 40f are provided below the screening plate 32 and attached to the back wall portion 40a in a spaced apart fashion to provide a discontinuous channel along the length of the first track 40 (not shown).

FIG. 3 shows that the angle portions above the screening plate 32 are arranged laterally offset from the additional angle portions which are shown below the screening plate 32. This is important in that no two angle portions are in direct vertical opposition, on opposite face sides, when the litter pans are slid onto the track 42. If there is a particularly tight fit of a pan flange interior of an angle portion because of foreign matter on the flange of the litter pan, or due to imperfect manufacturing tolerances, there is no directly opposing additional angle portion, holding a respective other pan flange therein, on the bottom side of the screening plate which would strongly resist any flex of the back wall portion 42a to accept the pan flange on the top side of the screening plate 32. Thus by offsetting the angle portions, binding or cracking of the track 42 is prevented. The same offset arrangement of upper and lower angle pieces is utilized on the first track 40 (not shown).

Figure 4:
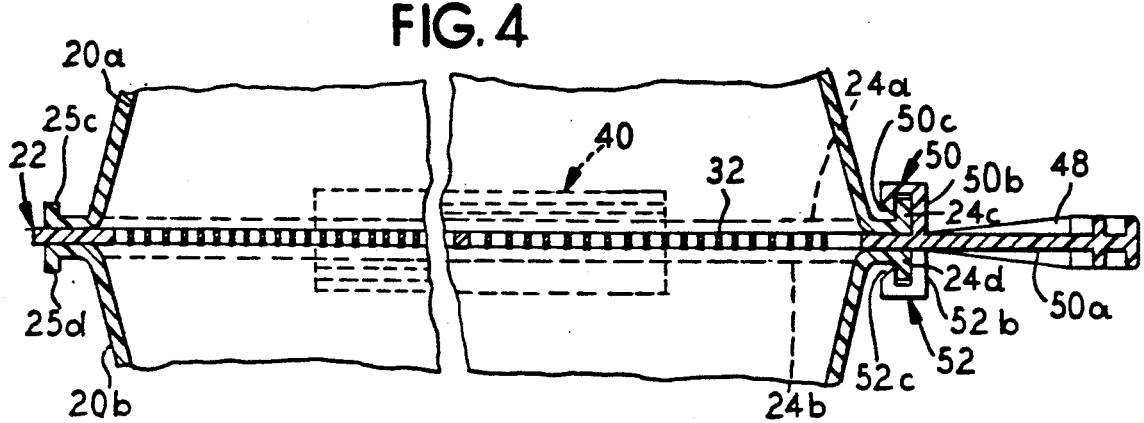
FIG. 4 is a partially discontinuous sectional view taken along line IV—IV of FIG. 2, showing the animal litter screening device assembled.

FIG. 4 shows the screen member 22 disposed between the first litter pan 20a and the second litter pan 20b in an assembled arrangement. The first catch 50 is shown engaged to the first flange 24a of the first litter pan 20a. The second catch 52 is shown engaged to the second flange 24b of the second litter pan 20b. The catches 50, 52 are flexibly movable away from their effective cooperating flange 24a, 24b because of a flexible and tiltable cantilever trunk portion 50a, 52a (also shown in FIG. 2). The first catch 50 also comprises a J-shaped hook portion 50b with an inclined engagement surface 50c. The inclined engagement surface 50c, when first abutted by and pressed by said flange 24a, more particularly by a turned leg 24c of the flange 24a, will cause the hook portion 50b to rise up and away from the flange 24a, the trunk portion 50a flexibly tilting, until the turned leg 24c passes into the J-shaped hook portion 50b. The first catch 50 thereupon will spring back downward capturing the turned leg 24c of the flange 24a within the J-shaped hook portion 50b. Of course, the engagement can be accomplished manually by raising the hook portion 50b with a finger and releasing to engage. To release the first litter pan 20a from the catch 50, the person must manually tilt the catch 50 upward with a finger, releasing the turned leg 24c from the J-shaped hook portion 50b, and sliding the pan 20a away from the first catch 50. The second catch 52 operates exactly the same except for its inverted orientation with respect to the first catch 50. The second catch 52 likewise has a J-shaped hook portion 52b with an inclined surface 52c, which captures a second turned leg 24d of the second flange 24b. The second catch 52 shown in FIG. 4 engages the second litter pan 20b. Both the catches 50 and 52 are arranged proximate to the handle 48 for the person to conveniently operate, usually with a finger of the hand holding the handle 48.

FIG. 4 also shows that the pans 20a, 20b have, at an end opposite the handle 48, turned legs 25c, 25d which serve to give the pans a symetrical configuration so that the pans can be engaged to the screen member 22 from either end of the pans simplifying operation.

FIG. 5 shows the assembled animal litter screen device in a post screening stage of operation. The arrangement shown in FIG. 3 wherein the second litter pan 20b was full of used and soiled animal litter has now been inverted as shown in FIG. 5, the reusable litter passing through the screening plate 32, screened litter now filling the first litter pan 20a and unwanted refuse 60 such as clumped animal litter caused by animal urine, or animal solid refuse, is trapped inside second litter pan 20b, on top of the screen member 22, too large to pass through the screening plate 32.

FIG. 6 shows an enlarged view of the track 42 holding first pan 20a and second pan 20b in a sliding fashion on opposite face sides of the screening surface 32. A similar detail is used for the first track 40. The angle portions 42c and 42f are shown slidingly capturing a vertical leg 24e of the first flange 24a, and a second vertical leg 24f of the second flange 24b, respectively, adjacent to the back wall portion 42a. The vertical legs 24e, 24f extend along a portion of the length of the flanges 24a, 24b respectively. One such vertical leg, a third vertical leg 24g, is shown in FIG. 1 and FIG. 5. A fourth vertical leg 24h, located on the second flange 24b, on an opposite lateral side to the second vertical leg 24f is shown in FIG. 5. Each pan 20a, 20b then, has two vertical legs, one engaging each track 40, 42. By capturing the vertical legs 24e, 24f, 24g, 24h and preventing lateral movement of the flanges 24a, 24b with respect to the track 42, the litter pans 20a, 20b are thereby guided angularly into the complimentary tracks 40, 42, thus preventing jamming or binding due to a misguided or misangled approach by the litter pans into the tracks. This provides for a quick, smooth, and foolproof engagement of the litter pans 20a, 20b into the tracks 40, 42 of the screen member 22.

To operate the improved animal litter screening device the following sequence is performed. The empty one of the two litter pans 20a is slid onto the screen member 22 approaching the screen member from an end opposite the handle 48. The first litter pan 20a engages the tracks 40, 42, the vertical legs 24e, 24g of the circumferential flange 24a are captured by angled portions and angle pieces of the two tracks 40, 42. The first litter pan 20a is progressed along the length of the tracks 40, 42 until the turned leg 24c of the flange 24a abuts, raises, and is captured by the hook portion 50b of the catch 50. The screen member 22 and the first litter pan 20a, joined together, are then slid onto the second litter pan 20b, the second litter pan holding the litter to be recycled. The second litter pan 20b engages the first track 40 and the second track 42 below the screening plate 32, the vertical legs 24f, 24h being captured by angle portions and angle pieces 42e, 42f, 42g and 40d, 40e and sliding the length of the channels 40 and 42. The second circumferential flange 24b of the second litter pan 20b engages the second catch 52, the turned leg 24d abutting, forcing downward and being captured by the hook portion 52b of the second catch 52. Both pans are now slidingly captured by the channels 40, 42 and laterally fixed by the catches 50, 52.

The animal litter screen device can now be inverted or flipped, then shook or fluffed to aid screening of the litter through the screening plate 32. When the screening operation is complete the refuse 60 will be deposited on a top side of the screening surface 32 and the screened litter will fill the, now on bottom, first pan 20a, as shown in FIG. 5. The catch 50 can now be manually disengaged by forcing the trunk portion 50a downward, and the first pan 20a can be slidingly disengaged from both the screen member 22 and the second pan 20b. The first pan 20a now filled with screened litter can be re-used by the animal in the normal mode. The second pan 20b with the engaged screen member 22 can be inverted to hold the refuse 60 in a secure manner inside the second pan 20b. The screen member 22 can be disengaged from the second pan 20b by depressing the second trunk portion 52a downward to release hook portion 52b from the turned leg 24d. The second pan 20b can now be slid the length of tracks 40, 42 to disengage from the screen member 22. The refuse 60 inside the second pan 20b is then dumped into an appropriate garbage receptacle for disposal. The second pan 20b can be re-engaged to the screen member 22 and both can be hung on a hook by the handle 48, for storage.

As the procedure was described above it is plainly seen that both litter pans can be removed from the screen member progressing in a single direction from the handle 48. Thus the person can minimize manipulating or positioning of the litter pans or rearrangements of the person's body to separate the pans from the screen member to complete the screening operation. The screening apparatus of the Miller patent requires the pans be removed from opposite directions with respect to the screen member. Minimizing manipulations during the screening operation is important because the task is unpleasant and the person will probably be in an uncomfortable crouched posture as the litter pans will usually be handled on the floor. Litter pans, being considered uncleanly, will not usually be relocated onto a person's table for manipulation.

The screen member 22 of the present invention is formed of one piece, a molded plastic. The molded plastic screen provides as integral: the reinforcing ribs 34, the frame 36, the tracks 40, 42, the handle 48 and the catches 50, 52. Thus a relatively complex screen member is reduced to being formed of one piece. This is quite an advantage over the Miller patent where a wire mesh screen is taught, necessitating the remaining components such as reinforcing, framing, handles and tracks be separate pieces somehow attached to the wire mesh screen.

Another advantage of the present invention is the fact that once both pans 20a, 20b are slidingly engaged to the channels 40, 42 and the catches 50, 52 have engaged the flanges 24a, 24b, the device is essentially a closed suitcase like compartment with a handle. This is not the case with the Miller patent device where no catches are provided. Picking up the Miller patented device by its handle could result in separation of at least one of the litter pans.

Although other modifications and changes may be suggested by those skilled in the art, it is the intention of the inventors to embody within the patent warranted hereon all changes and modifications as reasonably and properly come within the scope of their contribution to the art.

We claim:

1. An animal litter screening device comprising:
a first litter pan having side walls, a bottom, and a first substantially open face;
a second litter pan having second side walls, a second bottom, and a second substantially open face;
a screen member comprising a screening plate, and a track arranged on opposite face sides of said screening plate;
a first means for guiding arranged along a length of said first litter pan;
a second means for guiding arranged along a length of said second litter pan, said screen member arranged between said first litter pan and said second litter pan, said first substantially open face and said second substantially open face in facing arrangement, said first and second litter pans slidingly engaged to said screen member by engagement of said track with said first and second means for guiding;
a catch means for releasably locking at least one of said first and second litter pans to said screen member preventing sliding of said one of said first and second litter pans with respect to said screen member when said at least one of said first and second litter pans is positioned in an operable position onto said screen member.

2. An animal litter screen device according to claim 1 wherein said track extends outwardly of said first and second litter pans on opposite lateral sides of said device, said track comprising channels, and said first means for guiding and said second means for guiding comprise flanges on opposite lateral sides of said first litter pan and said second litter pan respectively, each one of said flanges slidingly engaged along a length of one said respective channel.

3. An animal litter screening device comprising:
a first litter pan having side walls, a bottom, and a first substantially open face;
a second litter pan having second side walls, a second bottom, and a second substantially open face;
a screen member comprising a screening plate, and a track arranged on opposite face sides of said screening plate, said track extends outwardly of said first and second litter pans on opposite lateral sides of said device, said track comprising channels;
a first means for guiding arranged along a length of said first litter pan;
a second means for guiding, said first means for guiding and said second means for guiding comprise flanges on opposite lateral sides of said first litter pan and said second litter pan respectively, each one of said flanges slidingly engaged along a length of one said respective channel arranged along a length of said second litter pan, said screen member arranged between said first litter pan and said second litter pan, said first substantially open face and said second substantially open face in facing arrangement, said first and second litter pans slidingly engaged to said screen member by engagement of said track with said first and second means for guiding, wherein at least one of said flanges comprises a vertical leg, and one of said channels cooperating therewith comprises a back wall portion with an angle portion mounted thereon, said angle portion capturing said vertical leg adjacent to said backwall portion, preventing lateral movement of said at least one of said flanges with respect to said one of said channels;
a catch means for securing at least one of said first and second litter pans to said screen member when said at least one of said first and second litter pans is positioned in an operable position onto said screen member.

4. An animal litter screening device according to claim 3 wherein said screen member further comprises a handle.

5. An animal litter screen device according to claim 3 wherein said catch means is lockable and releasable by a pressing force from a person's finger.

6. An animal litter screening device according to claim 5 wherein said catch means comprises two catch members, one catch member releasably locking each of said first and second litter pans.

7. An animal litter screening device according to claim 6 wherein each said catch member comprises a hook portion for engaging a leading end of one of said first and second litter pans when slidingly engaged to said screen member, and a trunk portion connected to said hook portion, said trunk portion connected at an opposite end from said hook portion to said screen member, said trunk portion flexibly tiltable to engage said hook portion to said one of said first and second litter pans.

8. An animal litter screening device according to claim 7 wherein at least one of said first litter pan and said second litter pan comprise on a leading end of said at least one of said first and second litter pans a flange portion with a turned leg, said turned leg engageable by said hook portion of said catch means.

9. An animal litter screening device according to claim 8 wherein said hook portion of said catch means comprises an inclined engagement surface facing an approach of said leading end, contact force from said turned leg of said at least one of said first and second litter pans sliding along said inclined engagement surface causes said hook portion to move in a direction providing clearance for said turned leg to move into engagement position with said hook portion.

10. An animal litter screening device according to claim 7 wherein said screen member comprises an integral molded plastic piece including said track, said handle, and said catch members.

11. An animal litter screening device according to claim 7 wherein said track comprises four channels, arranged in pairs on opposite lateral sides of said screen member, each pair comprising a channel on an opposite face sides of said screening plate than a respective other channel comprising said pair, each said channel comprising a backwall portion, each said channel comprising a plurality of angle portions arranged spaced apart along the length of said backwall portion, each angle portion arranged in offset fashion to a respective other angle portion on a respective other face side of said screening plate, said angle portions providing a discontinuous channel for slidingly engaging said first and second litter pans on opposite sides of said screening plate.

12. An animal litter screening device according to claim 11 wherein said first and second litter pans each comprise on each said flange, a laterally arranged vertical leg mounted on said flange, each said vertical leg captured interior of said angle portions of one channel, adjacent to said backwall portion of said one channel, preventing lateral movement of said vertical leg interior of said one channel.

13. An animal litter screening device according to claim 12 wherein said screen member further comprises an abutment plate to halt further movement of each of said first and second litter pans toward said handle, when said first and second litter pans are being slidingly engaged to said screen member, said abutment plate protecting a person's hand gripping said screen member.

14. An animal litter screening device according to claim 4 wherein said catch means is mounted to said screen member near to said handle, permitting operation of said catch means by a person's finger, said finger on the same hand gripping the handle.

15. An animal litter screening device according to claim 1 wherein said screening plate comprises integrally molded reinforcing ribs.

16. An animal litter screening device according to claim 1 wherein said screen member comprises an integral molded plastic piece including said track, said handle, and said catch means.

17. An animal litter screening device comprising:
a first litter pan having side walls, a bottom, and a first substantially open face;
a second litter pan having second side walls, a second bottom, and a second substantially open face;
a screen member comprising a screening plate, and a track arranged on opposite face sides of said screening plate, said track comprises four channels, arranged in pairs on opposite lateral sides of said screen member, each pair comprising a channel on an opposite face sides of said screening plate than a respective other channel comprising said pair, each said channel comprising a backwall portion, each said channel comprising a plurality of angle portions arranged spaced apart along the length of said backwall portion, each angle portion arranged in offset fashion to a respective other angle portion on a respective other face side of said screening plate;
a first means for guiding arranged along a length of said first litter pan;
a second means for guiding arranged along a length of said second litter pan, said screen member arranged between said first litter pan and said second litter pan, said first substantially open face and said second substantially open face in facing arrangement, said first and second litter pans slidingly engaged to said screen member by engagement of said track with said first and second means for guiding, said angle portions providing a discontinuous channel for slidingly engaging said first and second litter pans on opposite face sides of said screening plate;
a catch means for said angle portions providing a discontinuous channel for slidingly engaging said first and second litter pans on opposite face sides of said screening plate, securing at least one of said first and second litter pans to said screen member when said at least one of said first and second litter pans is positioned in an operable position onto said screen member.

18. An animal litter screening device according to claim 17 wherein said first and second litter pans each comprise on each said flange, a laterally arranged vertical leg mounted on said flange, each said vertical leg captured interior of said angle portions of one channel, adjacent to said backwall portion of said one channel, preventing lateral movement of said vertical leg interior of said one channel.

19. An animal litter screening device comprising:
a first litter pan having side walls, a bottom, and a first substantially open face;
a second litter pan having second side walls, a second bottom, and a second substantially open face;
a screen member comprising a screening plate, and a track arranged on opposite face sides of said screening plate;
a first means for guiding arranged along a length of said first litter pan;
a second means for guiding arranged along a length of said second litter pan, said screen member arranged between said first litter pan and said second litter pan, said first substantially open face and said second substantially open face in facing arrangement, said first and second litter pans slidingly engaged to said screen member by engagement of said track with said first and second means for guiding;
a catch means for securing at least one of said first and second litter pans to said screen member when said at least one of said first and second litter pans is positioned in an operable position onto said screen member, said catch means comprises a hook portion for engaging a leading end of said at least one of said first and second litter pans when slidingly engaged to said screen member, and a trunk portion connected to said hook portion, said trunk portion connected at an opposite end from said hook portion to said screen member, said trunk portion flexibly tiltable to engage said hook portion to said at least one of said first and second litter pans.

* * * * *